United States Patent [19]

Shibata et al.

[11] Patent Number: 4,970,906
[45] Date of Patent: Nov. 20, 1990

[54] METHOD AND APPARATUS FOR DETERMINING A ROTATION CENTER OF A ROTARY BODY

[75] Inventors: Hiroki Shibata; Atsushi Toda; Kazuki Takahashi; Kiyoshi Wada, all of Shizuoka, Japan

[73] Assignee: Koito Manufacturing Co., Ltd., Tokyo, Japan

[21] Appl. No.: 513,020

[22] Filed: Apr. 24, 1990

Related U.S. Application Data

[60] Continuation of Ser. No. 401,535, Aug. 30, 1989, abandoned, which is a continuation of Ser. No. 192,292, May 4, 1988, abandoned, which is a division of Ser. No. 2,947, Jan. 13, 1987, abandoned.

[30] Foreign Application Priority Data

Jan. 14, 1986 [JP] Japan .................................. 61-4352
Jan. 14, 1986 [JP] Japan .................................. 61-4353
Sep. 26, 1986 [JP] Japan ................................ 61-225795

[51] Int. Cl.⁵ ............................................. B60Q 1/00
[52] U.S. Cl. ................................ 73/865.800; 362/42
[58] Field of Search ......................... 73/118.1, 865.8;
364/424, 559; 362/37, 40-60, 42; 377/45, 29;
340/52 R, 686; 280/771; 180/141

[56] References Cited

U.S. PATENT DOCUMENTS

| 3,936,071 | 2/1976 | Ricketts, Jr. et al. | 340/686 |
| 4,007,357 | 2/1977 | Yanagishima | 340/52 R |
| 4,340,928 | 7/1982 | Hohmann, Jr. | 362/49 |
| 4,476,529 | 10/1984 | Nakamura et al. | 180/142 |
| 4,566,710 | 1/1986 | Furukawa et al. | 180/140 |
| 4,621,833 | 11/1986 | Soltis | 280/707 |
| 4,633,709 | 1/1987 | Numata et al. | 364/424 |
| 4,733,333 | 3/1980 | Shibata et al. | 362/40 |
| 4,794,536 | 12/1988 | Eto et al. | 180/141 |

Primary Examiner—Robert Raevis
Attorney, Agent, or Firm—Blakely, Sokoloff, Taylor & Zafman

[57] ABSTRACT

A method and an apparatus for determining a rotation center of a rotary body comprises a rotary body rotating in clockwise and counterclockwise directions in cooperation with the steering for a vehicle, and original position detecting circuit which detects a predetermined original angular position which the rotary body taken per each rotation, thus judging an original angular position taken when other original angular positions are not detected within a lapse of a predetermined time after the original angular position has been detected as rotation centers in the clockwise and counterclockwise directions of the rotary body.

16 Claims, 3 Drawing Sheets

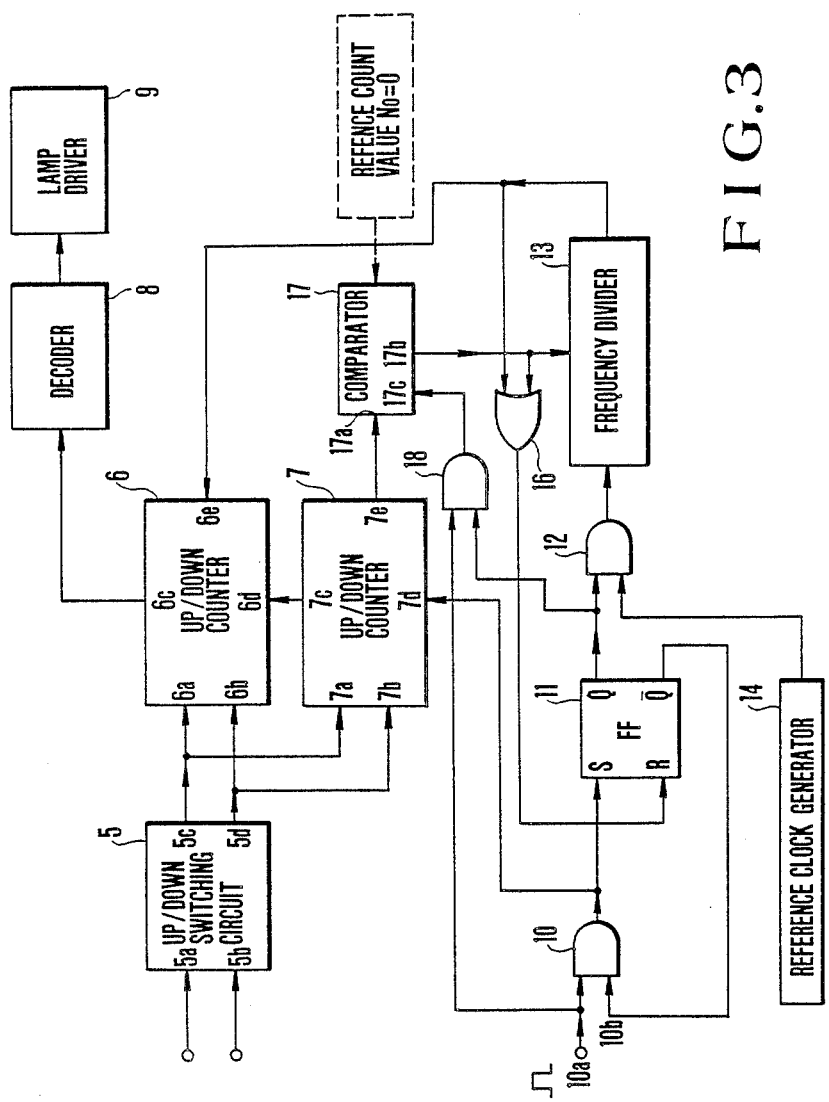

METHOD AND APPARATUS FOR DETERMINING A ROTATION CENTER OF A ROTARY BODY

This application is a continuation of Ser. No. 401,535, filed 8/30/89, (ABN) which is a continuation of Ser. No. 192,292 filed 5/4/88 (ABN) which is a divisional of Ser. No. 002,947 filed 1/13/87 (ABN).

BACKGROUND OF THE INVENTION

The present invention relates to a method and an apparatus for determining a rotational angular center of a rotary body, and more particularly to a method and an apparatus for determining a rotational angular center of a rotary body rotating in cooperation with a steering wheel of an automobile and the like.

Hitherto, in vehicles including automotive vehicles a rotary disk which rotates in cooperation with the steering wheel is provided. A plurality of slits are provided an equiangular distance in the rotary disk, and two photo-interrupters are disposed closely to the rotary disk to face the slits. A light passing through the slit is detected by the photo-interrupters, thereby information relating to the steering is obtained and used to conduct various controls. Namely, the two photo-interrupters produce pulse like electric signals which are the same in the waveform but nearly 90 degrees out of phase from each other. The electric signals are counted to detect a rotational direction and a rotational angle of the steering wheel.

However, there is no means to correct an error in such a conventional rotational angular detector, in such a case that an erroneous count occurs in the counter due to electric noises etc., resulting in the problem that the system erroneously operates according as the errors are accumulated. Moreover, when there is employed a power cut off method in which the power feed to the rotation angular detector is cut off after the power supply is switched off in order to lessen power consumption, a change of an angular position of the steering wheel until the ignition switch is turned on next time results in an error and such errors are accumulated.

In addition, since the rotational angle detector produces same output value per each 360 degrees rotation of the steering wheel in clockwise and counterclockwise directions, it is impossible to discriminate between the steering angular position when the vehicle advances in a beeline and a steering angular position after the steering wheel has made one revolution, resulting in the possibility that the various controls are erroneously conducted.

SUMMARY OF THE INVENTION

An object of the present invention is to provide a method and an apparatus for determining a rotational angular center of a rotary body which eliminate drawbacks of the above-mentioned prior arts, and which precisely operates even when the noise occurs or it is reoperated after the power supply switch has been cut off.

Another object of the present invention is to provide a method and an apparatus which can determine a precise angular position of a steering wheel when the automobile is traveling in a straight line.

A method for determining a rotational angular center of a rotary body according to the present invention comprises the steps of determining a predetermined rotational angular position of a rotary body as a rotational angular center, and detecting, as an original angular position, a rotational angular position identical to the rotational angular center, which the rotary body takes per each rotation in clockwise and counterclockwise directions with the rotational angular center being as the starting point, and recognizing the original angular position detected as the rotational angular center when an original angular position is not detected within a predetermined time after one original angular position has been detected.

An apparatus for determining a rotational angular center of a rotary body according to the present invention comprises: a rotary body rotating in a clockwise or counterclockwise direction in cooperation with a steering wheel for a vehicle, means which detects, as an original angular position, each rotational angular position identical to a rotational angular position when the vehicle goes straight, which said rotary body takes per each rotation in clockwise and counterclockwise directions to output a detection signal; means which inputs the detection signal to measure a rotational angle of the rotary body with an original angular position lately detected being as a reference; and control means wherein when no original angular position is detected within a predetermined time after the current original angular position has been detected, the control means recognizes its original angular position as the rotational angular position when the vehicle goes straight to effect a control to allow the rotational angular measuring means to measure a rotational angle with the original angular position being as a reference.

BRIEF DESCRIPTION OF THE DRAWINGS

FIG. 3 is a block diagram illustrating another embodiment according to the present invention.

DETAILED DESCRIPTION OF PREFERRED EMBODIMENTS

Figure 1:
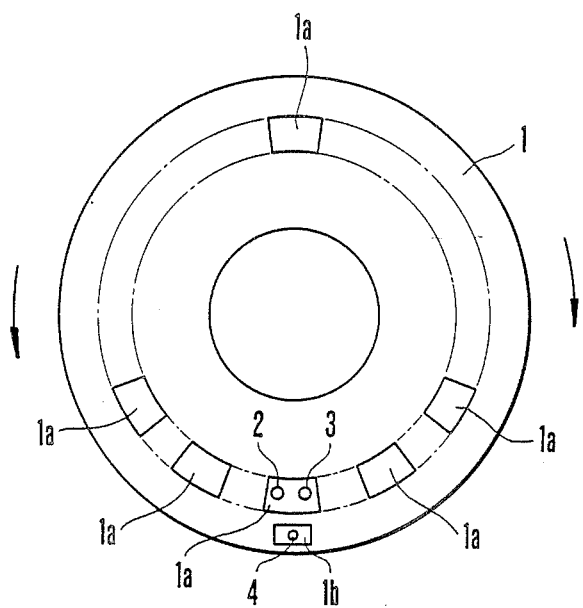
FIG. 1 is a view for explaining a rotational angular position sensor.
Figure 2:
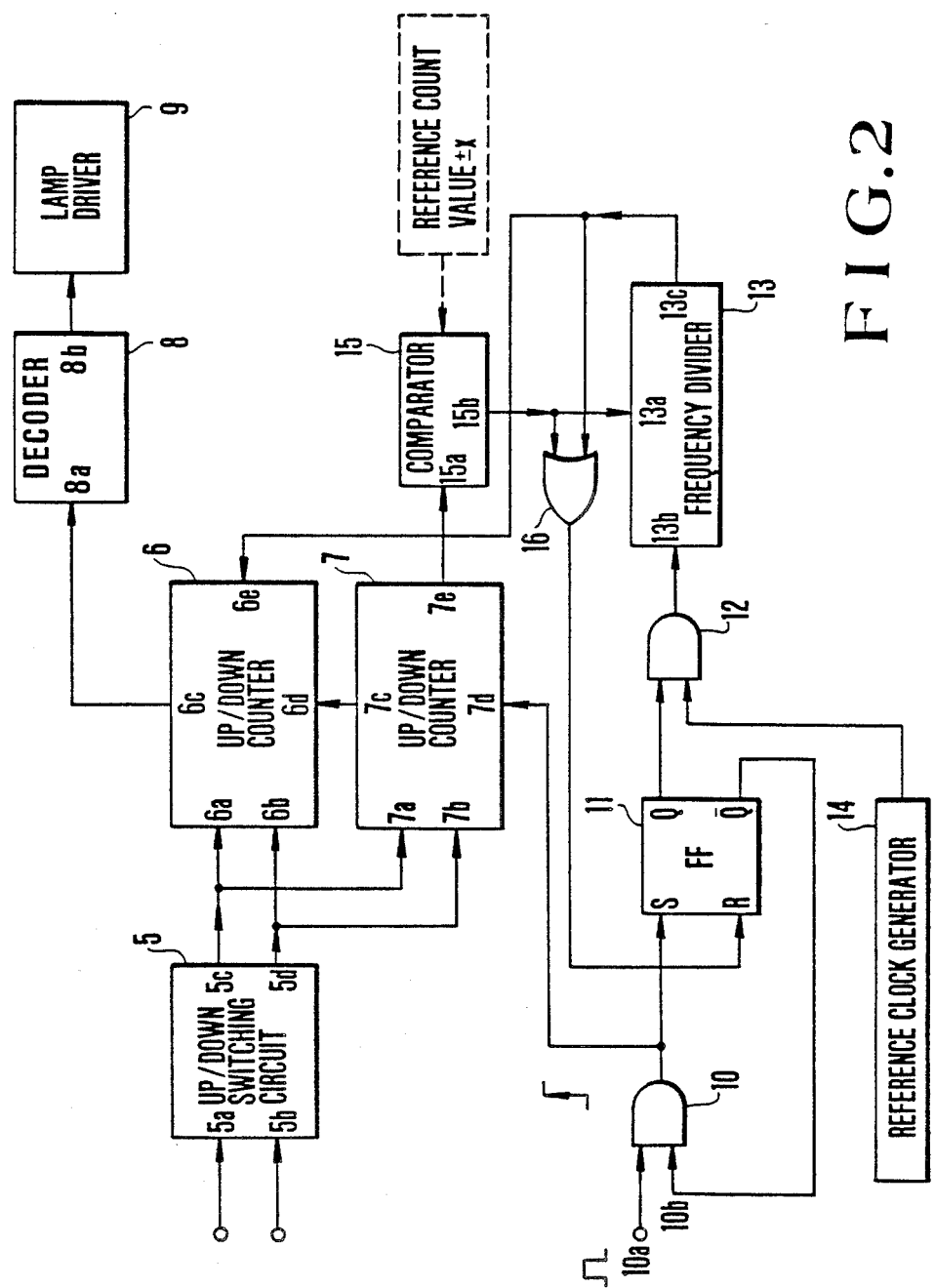
FIG. 2 is a block diagram illustrating an embodiment according to the present invention.

FIG. 1 shows a rotational angular position sensor rotating in cooperation with a steering wheel for a vehicle. This position sensor is composed of a rotary disk 1 rotating in cooperation with the steering wheel, and photo-interrupters 2, 3 and 4 each comprising a light emitting element and a light receiving element. The photo-interrupters 2 and 3 are adjacently disposed at the passing position of slits 1a which are opened at an equiangular distance in the outer peripheral portion of the rotary disk 1 in the same form. These photo-interrupters 2 and 3 produce pulse like electric signals which have the same waveform and nearly 90 degrees out of phase according as the slits 1a pass by the rotation of the rotary disk 1. Such pulse like electric signals are input to an UP/DOWN switching circuit 5 (FIG. 2). In the outer peripheral surface at a predetermined rotational angular position of the rotary disk 1, a slit 1b for detecting an original position is independently provided. The photo-interrupter 4 detects passing of the slit 1b.

The relationship between the rotary disk 1 and the photo-interrupter 4 is set in a manner that the slit 1b and the photo-interrupter 4 are opposite to each other at an angular position of a steering wheel (which will be called a "steering center" hereinafter) when a vehicle advances in a beeline. A rotational angular position of the rotary disk 1 such that the photo-interrupter 4 is opposite to the slit 1b will be called an "original position" of the rotary disk 1 or the steering wheel hereinafter. Further, an original position at the steering center (i.e. advancing in a beeline) will be called a "rotation center" hereinafter. Namely, everytime the steering wheel makes one rotation in clockwise and anticlockwise directions with the steering center being as the center, the original position of the rotary disk 1 which has been shifted by an angle of 360 degrees is detected. Since a steering wheel for an automotive vehicle is generally constituted so that it can make a rotation less than two rotations in respective clockwise and anticlockwise directions with the steering center being as the center, three original positions, i.e., the original position of the rotation center and those in the right and left directions, are detected by the photo-interrupter 4 and an original position detection signal at each of that times is then output.

FIG. 2 is a block diagram illustrating an embodiment of an apparatus for determining a rotation center of a steering wheel according to the present invention. In FIG. 2, output signals from the photo-interrupters 2 and 3 of the rotational angular position sensor shown in FIG. 1 are input to input terminals 5a and 5b of the UP/DOWN switching circuit 5. The UP/DOWN switching circuit 5 inputs pulse like electric signals from the rotational angular position sensor to output up and down signals numbers of which correspond to amounts of clockwise and counterclockwise steerings, respectively. Output terminals 5c and 5d of the UP/DOWN switching circuit 5 are connected to input terminals 6a and 7a of an UP/DOWN counters 6 and 7 and input terminals 6b and 7b thereof, respectively. The UP/DOWN counters 6 and 7 effect up or down count by the number of up or down signals input, respectively. Namely, when the rotary disk 1 is positioned at the rotation center, the count value of the UP/DOWN counter 6 is set to zero. By the clockwise steering, its count value increases one by one, and by the counterclockwise steering, its count value decreases one by one.

An output terminal 6c of the UP/DOWN counter 6 is connected to an input terminal 8a of a decoder 8. An input terminal 6d of the UP/DOWN counter 6 is connected to one output terminal 7c of the UP/DOWN counter 7. When the UP/DOWN counter 6 inputs a load signal from a load terminal 6e, it takes in a count value of the UP/DOWN counter 7 at that time through the input terminal 6d in accordance with the load signal at the load terminal 6e, to replace the content of its count value with the input to the input terminal 6d. The decoder 8 selects its own output terminals (not shown) corresponding to the output of the UP/DOWN counter 6 to set each of levels of the output terminals to low ("L") or high ("H"). An output terminal 8b of the decoder 8 is connected to an input terminal of a lamp driver 9 which varies irradiation direction of a head lamp (not shown) in accordance with an output signal from the decoder 8. An output terminal 7e of the UP/DOWN counter 7 is connected with an input terminal 15a of a comparator 15. To the comparator 15, count values $\pm \chi$ corresponding to rotational angular position of $\pm 180$ degrees when the rotation center of the rotary disk 1 is taken as a reference are set in advance as reference count values. An output terminal 15b of the comparator 15 is connected to an input terminal 13a of a frequency divider 13 and to one input terminal of an OR circuit 16. When a count value of the UP/DOWN counter 7 is not within the count values of $\pm \chi$, the comparator 15 outputs a reset signal to the frequency divider 13. An output terminal 13c of the frequency divider 13 is connected to the load input terminal 6e and to the other input terminal of the OR circuit 16.

On the other hand, one input terminal 10a of an AND circuit 10 is connected to the photo-interrupter 4 shown in FIG. 1. To this input terminal 10a, an original position detection signal which goes "H" when the original position is detected is delivered. An output terminal of the AND circuit 10 is connected to a reset terminal 7d of the UP/DOWN counter 7 and to a set (S) terminal of a R-S flip-flop 11. When the output level of the AND circuit 10 goes "H", the count value of the UP/DOWN counter 7 is reset and is returned to zero. The R-S flip-flop 11 has a output terminal $\overline{Q}$ connected to the other input terminal 10b of the AND circuit 10, a reset (R) input terminal connected to an output terminal of the OR circuit 16, and a output terminal Q connected to one input terminal of the AND circuit 12. To the other input terminal of the AND circuit 12, an output clock pulse signal from a reference clock generator 14 is input. An output terminal of the AND circuit 12 is connected to an input terminal 13b of the frequency divider 13. A clock pulse signal passing through the AND circuit 12 is input to the frequency divider 13. The frequency divider 13 overflows whenever the clock pulse signal continues to be input for more than 30 seconds. As described above, when this load signal is input to the input terminal 6e, the UP/DOWN counter 6 takes in a count value of the UP/DOWN counter 7 at that time via the input terminal 6d to rewrite its own count value.

The operation of the apparatus thus configured will be now described. It is here assumed that an automotive vehicle is advancing in a straight line, and the rotary disk 1 rotating in cooperation with the steering is positioned at the rotation center as shown in FIG. 1. At this time, the count value of the UP/DOWN counter 6 must be equal to zero in fact. In the prior art, however, there is the possibility that the count value is different from zero due to electric noises or rotation of the steering wheel after the ignition switch has been turned off. When such a count value which is different from zero is input to the decoder 8, the irradiation direction of the head lamp which is controlled by the output of the decoder 8 is deviated from the required one in correspondence with the count value. However, according to this embodiment of the present invention, it is possible to control correctly the irradiation direction of the head lamp in cooperation with the steering because of the corrective operation described later.

More of running paths for automotive vehicles are straight paths and there is no possibility that an automotive vehicle travels for a long time with the steering wheel being rotated in a 360-degree arc. Namely, even when the steering wheel is steered in a 360-degree arc from the steering center, the time period during which the original position detection signal is produced is short and the steering wheel is returned to the vicinity of the steering center after the automotive vehicle has traveled for a short time. In accordance with the inventer's investigation under the condition where an automotive vehicle is caused to actually run, it has been experimentally confirmed that time required for returning the steering wheel which has been rotated in a 360 degree on an U-turn road etc. to the vicinity of the steering center is less than 30 seconds. Namely, within 30 seconds after the original position detection signal has been produced at a position where the steering wheel is rotated in a 360-degree arc, steering more than 180 degrees in terms of the rotational angle is necessarily conducted. In other words, unless steering more than 180 degrees is conducted within 30 seconds after the original position detection signal has been produced, it may safely be said that the original position at that time is judged as the rotation center position.

It is now assumed that the R-S flip-flop 11 and the frequency divider 13 are in initial reset state and an original position detection signal has been produced at the rotation center of the rotary disk 1 (FIG. 1). At this time, the level of the input terminal 10a of the AND circuit 10 is "H". Since the $\overline{Q}$ output of the R-S flip-flop 11, i.e., the signal of "H" has been already input to the input terminal 10b of the AND circuit 10, the output level of the AND circuit 10 goes "H" to reset the UP/-DOWN counter 7, causing the count value to be equal to zero, and to set the R-S flip-flop 11. Thus, the levels of the Q and $\overline{Q}$ outputs of the R-S flip-flop 11 become "H" and "L", respectively. When the level of the $\overline{Q}$ output of the R-S flip-flop 11 is inverted to "L", the gate of the AND circuit 10 is closed. When the level of the Q output thereof is inverted to "H", the gate of the AND circuit 12 is opened. Accordingly, the clock pulse signal output from the reference clock generator 14 passes through the AND circuit 12 and begins to be input to the frequency divider 13. At this time, since the count value of the UP/DOWN counter 7 has been reset to zero and this value of zero falls within the range of the reference count values $\pm\chi$, the comparator 15 does not deliver a reset signal to the frequency divider 13, so that the frequency divider 13 continues the frequency dividing operation of the clock pulse signal input from the AND circuit 12. This frequency dividing operation is continuously carried out not only in the case where the count value of the UP/DOWN counter 7 is zero but also within the count values of $\pm\chi$. Namely, in the case of steering within rotational angles of $\pm 180$ degrees with the steering center being as the center, the comparator 15 does not output the reset signal, so that the frequency dividing operation at the frequency divider 13 continues. When 30 seconds have elapsed under such a condition, the frequency divider 13 overflows, so that the load signal is output to the UP/DOWN counter 6. Thus, the UP/DOWN counter 6 receives the load signal to take in the count value at the present time of the UP/DOWN counter 7 to rewrite the count value. Namely, when the rotary disk 1 is positioned at the rotation center at this time, the count value of the UP/DOWN counter 7 is equal to zero. This count value is transferred to cause the count value of the UP/DOWN counter 6 to set equal to zero. When the rotary disk 1 is not positioned at the rotation center at this time, but its rotational angle falls within the angular range of $\pm 180$ degrees, the UP/DOWN counter 7 effects a precise count to make the count value at the rotation center zero. This count value is transferred to the UP/DOWN counter 6. Even if the UP/DOWN counter 6 is erroneously effecting count operation, the precise count value with the rotation center being as reference is taken into the UP/DOWN counter 6, so that accurate correction is made. The load signal output from the frequency divider 13 is input to the R terminal of the flip-flop 11 through the OR circuit 16 to place the R-S flip-flop 11 in reset state, thus to stand by occurrence of the next original position detection signal.

The operation after the original position detection signal has been produced at the going-straight steering position has been described. In addition, during running of an automotive vehicle, the original position detection signal will be produced also when the steering wheel is rotated in a 360-degree arc. It is now assumed that the R-S flip-flop 11 and the frequency divider 13 are in initial reset state, and the steering wheel is rotated in a 360-degree arc from the steering center, so that an original position detection signal is produced. At this time, the level of the input terminal 10a of the AND circuit 10 goes "H" in the same manner as stated above. As a result, the count value of the UP/DOWN counter 7 becomes equal to zero, and a clock pulse signal output from the reference clock generator 14 begins to be input to the frequency divider 13. At this time, since the count value of the UP/DOWN counter 7 is equal to zero, and this count value of zero is within the range of reference count values $\pm\chi$, the comparator 15 does not output a reset signal to the frequency divider 13, with the result that the frequency dividing operation at the frequency divider 13 is continuously carried out. However, a time required for returning the steering wheel from the position where the steering wheel is rotated in a 360-degree arc to the vicinity of the steering center is less than 30 seconds as previously described. Accordingly, the UP/DOWN counter 7 effects a count equivalent to more than 180 degrees in terms of the rotational angle of the steering wheel within 30 seconds, so that the count value is out of the range of reference count values $\pm\chi$. At this time, the comparator 15 outputs a signal of "H" to reset the frequency divider 13. In this instance, the reset signal is input to the frequency divider 13 within 30 seconds after the clock pulse signal begins to be input to the frequency divider 13. Accordingly, the frequency divider 13 is reset before the clock pulse signal overflows, so that the load signal is not supplied to the UP/DOWN counter 6. Namely, the count value of the counter 7 at this time is equivalent to a count value obtained when the original position in a clockwise or counterclockwise direction is assumed to be the rotation center. There is no possibility that this count value is used to correct the count value of the UP/DOWN counter 6. The reset signal output from the comparator 15 is also input to the R terminal of the R-S flip-flop 11 through the OR circuit 16 to place this flip-flop 11 in reset state, thus to stand by occurrence of the next original position detection signal.

As described above, in accordance with the apparatus according to this embodiment, the UP/DOWN counter 7 performs a count operation under condition where each original position is assumed to be a virtual rotation center. Since the count value transferred to the UP/DOWN counter 6 is really equivalent to a count value corresponding to the true rotation center, precise and accurate correction is made using this count value, thus making it possible to control the irradiation direction of the head lamp without hindrance in cooperation with the steering. In addition, after an original position detection signal is produced once at the rotation center, even if steering is conducted thereafter (within the range of $\pm 180$ degrees), the correction of the count operation of the UP/DOWN counter 6 is accurately performed, and even when a vehicle is running on a curved road, the correction of the operation for changing the irradiation direction is securely conducted.

FIG. 3 is a block diagram illustrating another embodiment of a rotation center determining apparatus according to the present invention. In FIG. 3, the same components as those in FIG. 1 are designated by the same reference numerals, respectively. The arrangement in FIG. 3 is the same as that in FIG. 1 except for the following points.

A reference count to be set in advance in the comparator 17 is zero (which will be referred to as "No" hereinafter). When a signal of "H" is input to an enable terminal 17c of the comparator 17, the comparator 17 takes in a count value of the UP/DOWN counter 7 at the present time to compare it with the reference count value No. As a result, when the count value thus taken in is not equal to the reference count value No, the comparator 17 outputs a reset signal from an output terminal 17b to the frequency divider 13. The enable terminal 17c of the comparator 17 is connected to the output terminal of the AND circuit 18 having one input terminal to which an original position detection signal is input, and the other input terminal to which Q output of the R-S flip-flop 11 is input.

The operation of the circuit shown in FIG. 3 will be now described.

It is now assumed that the R-S flip-flop 11 and the frequency divider 13 are in initial reset state, the steering wheel is positioned at the center thereof, and an original position detection signal ("H") is input to the AND circuits 10 and 18. Since $\bar{Q}$ output of the R-S flip-flop 11, i.e., a signal of "H" has been already input to the other input terminal of the AND circuit 10, the output level of the AND circuit 10 becomes "H" to reset the UP/DOWN counter 7 and to place the R-S flip-flop 11 in set state. Thus, the count value of the UP/DOWN counter 7 becomes equal to zero, and levels of the Q and $\bar{Q}$ outputs of the R-S flip-flop 11 become "H" and "L", respectively. As a result, the gate of the AND circuit 10 is closed, whereas the gates of the AND circuits 12 and 18 are opened. Thus, the clock pulse signal begins to be delivered from the reference clock generator 14 to the frequency divider 13, and the level of the enable terminal 17c of the comparator 17 becomes "H". As a result, the count value at the present time of the UP/DOWN counter 7, i.e., "zero" is taken into the comparator 17 and then is compared with the reference value No. In this instance, since both the values are equal to each other, the comparator 17 does not output a reset signal to the frequency divider 13. The frequency divider 13 continuously carries out the frequency dividing operation of the clock pulse signal input. The frequency dividing operation at the frequency divider 13 is performed as described in the embodiment in FIG. 1. Namely, in the case where no original position detection signal is produced, since comparative operation itself at the comparator 17 is not conducted, there is no possibility that the reset signal is output to the frequency divider 13. Namely, after the original position detection signal has been produced once at the rotation center, the frequency dividing operation at the frequency divider 13 is continuously carried out even if the original position detection signal had not continued to be produced. When 30 seconds has passed under such a condition, an overflow occurs at the frequency divider 13, so that the load signal is output to the UP/DOWN counter 6. Thus, the UP/DOWN counter 6 receives the load signal to take in a count value at the present time of the UP/DOWN counter 7 to rewrite the count value. Namely, at this time, if the rotary disk 1 is positioned at the rotation center, the count value of the UP/DOWN counter 7 is equal to zero. This count value is transferred, so that the count value of the UP/DOWN counter 6 becomes zero. In contrast, in the case where the rotary disk 1 is not positioned at the rotation center at this time and has made a rotation (within ±1 rotation), a precise count with the rotation center being as reference is being conducted at the UP/DOWN counter 7, and this count value is transferred to the UP/DOWN counter 6. Namely, even if the UP/DOWN counter 6 has erroneously effected count operation, the precise count value with the rotation center being as reference is taken into the UP/DOWN counter 6, so that accurate correction is conducted. The load signal output from the frequency divider 13 is also input to the R terminal of the R-S flip-flop 11 through the OR circuit 16 to place the R-S flip-flop 11 in reset state, thus to stand by occurrence of the next original position detection signal.

The operation after the original position detection signal has been produced at the center of the steering wheel has been described. During running of an automotive vehicle, an original position detection signal is produced also in the clockwise or counterclockwise original position. It is now assumed that R-S flip-flop 11 and the frequency divider 13 are in initial reset state, and an original position detection signal has been produced in the clockwise or counterclockwise original position. At this time, the original position detection signal of "H" is input to the AND circuits 10 and 18 in the same manner as stated above. Thus, the count value of the UP/DOWN counter 7 becomes equal to zero and the clock pulse signal output from the reference clock generator 14 begins to be input to the frequency divider 13. At this time, the comparator 17 takes in the count value of the UP/DOWN counter 7 and compares it with the count value No. Since the count value of the counter 7 has been already equal to zero at that time, it becomes equal to the reference value No, so that the frequency divider 13 continuously effects frequency dividing operation without being subjected to reset. However, since a time required for returning the steering wheel from the clockwise or counterclockwise original position to the center of the steering wheel is less than 30 seconds as previously described, the original position detection signal produced at the rotation center within this time period of 30 seconds enables the comparator 17 via the AND circuit 18. At this time, the count value of the UP/DOWN counter 7 taken into the comparator 17 is equal to a count value corresponding to one rotation with the clockwise or counterclockwise original position being set to zero, which is not equal to the reference count value No. Accordingly, the comparator 17 outputs a signal of "H" at this time to reset the frequency divider 13. Accordingly, the frequency divider 13 is reset before its overflows. As a result, since the load signal is not output to the UP/DOWN counter 6, no correction of the count value at the UP/DOWN counter 6 is made. The reset signal output from the comparator 17 is also input to the R input terminal of the R-S flip-flop 11 to place this R-S flip-flop 11 in reset state to stand by occurrence of the next original position detection signal.

As described above, in accordance with the apparatus according to this embodiment, the UP/DOWN counter 7 performs a count operation under condition where each original position is assumed to be a virtual rotation center. Since the count value transferred to the UP/DOWN counter 6 is really equivalent to a count value corresponding to the true rotation center, precise and accurate correction is made using this count value, thus making it possible to control the irradiation direction of the head lamp without hindrance in cooperation with the steering. In addition, after an original position detection signal is produced once at the rotation center, even if steering is conducted thereafter (within the range of ±180 degrees), the correction of the count operation of the UP/DOWN counter 6 is accurately performed, and even when a vehicle is running on a curved road, the correction of the operation for changing the irradiation direction is securely conducted.

In the above-mentioned two embodiments, the setting has been made such that the frequency dividing ratio of the frequency divider 13 is equal to 30 seconds in terms of time, but it is not limited that a time corresponding to the frequency dividing ratio is necessarily equal to 30 seconds. It is needless to say that a time corresponding to the frequency dividing ratio may be set to an arbitrary time more than a time required for securely returning the steering wheel from the clockwise or counterclockwise original position to the center of the steering wheel. Explanation has been made in connection with the corrective operation of the counter in the system to change the irradiation direction of the head lamp in cooperation with the steering, which is so called "cornering lamp system". In addition, correction of the counter in other systems to control the steering action in cooperation with the steering may be made. This invention is not limited to the application to such a correction of the counter, but can also determine the rotation center of a rotary body rotating in cooperation with an external operation. By using the rotation center thus determined as reference, various controls may be conducted, resulting in extremely high utility.

As stated above, this embodiment makes it possible to determine, as the rotation center of a rotary body, an original position obtained when other original positions cannot be detected by the time a predetermined time elapses among original positions taken per each rotation of the rotary body. For instance, in the case of rotating this rotary body in cooperation with a steering wheel for an automotive vehicle etc., it is possible to accurately judge the going-straight steering position. Thus, correction of an erroneous count of the counter in the judgement of the going-straight steering position.

As described above, the cornering lamp system according to this embodiment can securely detect the going-straight steering position in a short time, and can accurately make a correction of the operation for changing the irradiation direction in the transient running mode where the steering wheel is rotated by a large steering angle in a low speed condition, e.g., putting a vehicle into a garage, change of direction and moving a vehicle in its width direction etc., or in the special running mode, e.g., on a mountain path where tight corners are contigurous.

In this embodiment, it has been described that the steering wheel for an automotive vehicle makes three or four rotations in the case of lock-to-lock and the steering wheel takes three original positions including the steering center in the range where the steering wheel of the lock-to-lock type is rotatable. However, the present invention is applicable to the steering having a broder rotatable range. In this case, it is needless to say that it is the irredusible minimum of a demand that the steering wheel takes an odd number of different original positions including the steering center. In addition, while the steering sensor 19 outputs an analog signal voltage in cooperation with the steering in this embodiment, it is of course that the sensor output is not limited to the analog signal voltage and such a processing may be performed on the basis of an output from a sensor of the digital type.

What is claimed is:

1. A method of determining a rotational angular center of a steering wheel being rotated in a clockwise or counterclockwise direction, each revolution of said steering wheel having an original angular position wherein the original angular position for one of said revolutions is the rotational angular center to be determined, said method comprising the steps of:
    (a) arranging a position sensor including a photo interrupter and a rotary disk with a slit opening, said disk rotating in cooperation with the steering wheel, said position sensor having the capability of detecting each of said original angular positions for each of said revolutions;
    (b) using said position sensor for detecting said original angular position for each of said revolutions;
    (c) assigning one of said detecting original angular positions to be a potential rotational angular center of said steering wheel;
    (d) determining that the assigned potential rotational angular position is the rotational angular center of said steering wheel when no other original position is detected within a predetermined period of time.

2. The method defined by claim 1 wherein said position sensor includes three photo-interrupters and a rotary disk with a plurality of slit openings disposed at an equiangular distance around said disk within a first concentric ring of said disk and a single slit opening disposed within a second concentric ring of said disk such that two of said photo-interruptors are disposed adjacent to each other at a passing position of said plurality of slit openings and said third photo-interrupter is disposed at a passing position of said single slit opening, wherein when said single slit opening passes by said third photo-interrupter, said steering wheel is at one of said original angular positions.

3. The method defined by claim 2 wherein as said plurality of slit openings pass by said first and second photo-interruptors pulse signals are generated representing an amount of steering in a clockwise and counter-clockwise direction from said rotational angular center such that said amount is zero at said rotational angular center.

4. A method of determining a rotational angular center of a steering wheel being rotated in a clockwise or counterclockwise direction, each revolution of said steering wheel having an original angular position corresponding to a rotational angle, wherein the original angular position for one of said revolutions is, the rotational angular center to be determined, said method comprising the steps of:
    (a) arranging a position sensor including a photo interrupter and a rotary disk with a slit opening, said disk rotating in cooperation with the steering wheel, said position sensor having the capability of detecting each of said original angular positions for each of said revolutions;
    (b) using said position sensor for detecting said original angular position for each of said revolutions;
    (c) measuring a rotational angle of said steering wheel using the rotational angle of one of said detected original angular positions as a reference;

(d) determining that the measured rotational angle is the rotational angular center of said steering wheel when the measured rotational angle remains within a predetermined angular range for a predetermined period of time.

5. The method defined by claim 4 wherein said position sensor includes three photo-interrupters and a rotary disk with a plurality of slit openings disposed at an equiangular distance around said disk within a first concentric ring of said disk and a single silt opening disposed within a second concentric ring of said disk such that two of said photo-interruptors are disposed adjacent to each other at a passing position of said plurality of slit openings and said third photo-interrupter is disposed at a passing position of said single slit opening, wherein when said single slit opening passes by said third photo-interrupter, said steering wheel is at one of said original angular positions.

6. The method defined by claim 5 wherein as said plurality of slit openings pass by said first and second photo-interruptors, pulse signals are generated representing an amount of steering in a clockwise and counter-clockwise direction from said rotational angular center such that said amount is zero at said rotational angular center.

7. An apparatus for determining a rotational angular center of a steering wheel being rotated in a clockwise or counterclockwise direction, each revolution of said steering wheel having an original angular position wherein the original angular position for one of said revolutions is the rotational angular center to be determined, said apparatus comprising:
(a) a position sensor including a photo interrupter and a rotary disk with a slit opening, said disk rotating in cooperation with the steering wheel, said position sensor for detecting each of said original angular positions for each of said revolutions;
(b) means for assigning one of said detected original angular positions to be a potential rotational angular center of said steering wheel;
(c) means for determining that the assigned potential rotational angular position is the rotational angular center of said steering wheel when no other original angular position is detected within a predetermined period of time.

8. An apparatus for determining a rotational angular center of a rotary body as set forth in claim 7, wherein said rotational angle measuring means includes first and second UP/DOWN counters which input a signal representing a rotational angle of said rotary body to effect an up or down count with said rotational angular center being as a reference, said first UP/DOWN counter outputting its count value as angular information and replacing its count value with the content of said second UP/DOWN counter in response to the signal output from said timer means.

9. An apparatus for determining a rotational angular center of a rotary body as set forth in claim 8 further comprising comparing means in which a reference count value is set in advance, and comparing means comparing an output from said second UP/DOWN counter with said reference count value to reset said timer means in accordance with the compared result.

10. The apparatus defined by claim 7 wherein said position sensor includes three photo-interrupters and a rotary disk with a plurality of slit openings disposed at an equiangular distance around said disk within a first concentric ring of said disk and a single slit opening disposed within a second concentric ring of said disk such that two of said photo-interruptors are disposed adjacent to each other at a passing position of said plurality of slit openings and said third photo-interrupter is disposed at a passing position of said single slit opening, wherein when said single slit opening passes by said third photo-interrupter said steering wheel is at one of said original angular positions.

11. The apparatus defined by claim 10 wherein as said plurality of slit openings pass by said first and second photo-interruptors pulse signals are generated representing an amount of steering in a clockwise and counter-clockwise direction from said rotational angular center such that said amount is zero at said rotational angular center.

12. An apparatus for determining a rotational angular center of a steering wheel being rotated in a clockwise or counterclockwise direction, each revolution of said steering wheel having an original angular position corresponding to a rotational angle, wherein the original angular position for one of said revolutions is the rotational angular center to be determined, said apparatus comprising:
(a) a position sensor including a photo interrupter and a rotary disk with a slit opening, said disk rotating in cooperating with the steering wheel, said position sensor for detecting each of said original angular positions for each of said revolutions;
(b) means for measuring a rotational angle of said steering wheel using the rotational angle of one of said detected original angular positions as a reference;
(c) means for determining that the measured rotational angle is the rotational angular center of said steering wheel when the measured rotational angle remains within a predetermined angular range for a predetermined period of time.

13. An apparatus for determining a rotational angular center of a rotary body as set forth in claim 12, wherein said rotational angle measuring means includes first and second UP/DOWN counters which output a signal representing a rotational angle of said rotary body to effect an up or down count with said rotational angular center being a reference, said first UP/DOWN counter outputting its count value as angular information and replacing its count value with the contents of said second UP/DOWN counter in response to the signal output from said timer means.

14. An apparatus for determining a rotational angular center of a rotary body as set forth in claim 13 further comprising comparing means in which the predetermined range of angle is set in advance, said comparing means comparing an output from said second Up/DOWN counter with the predetermined range of angle to reset said timer means in accordance with the compared result.

15. The apparatus defined by claim 12 wherein said position sensor includes three photo-interrupters and a rotary disk with a plurality of slit openings disposed at an equiangular distance around said disk within a first concentric ring of said disk and a single slit opening disposed within a second concentric ring of said disk such that two of said photo-interruptors are disposed adjacent to each other at a passing position of said plurality of slit openings and said third photo-interrupter is disposed at a passing position of said single slit opening, wherein when said single slit opening passes by said third photo-interrupter, said steering wheel is at one of said original angular positions.

16. The apparatus defined by claim 15 wherein as said plurality of slit openings pass by said first and second photo-interruptors pulse signals are generated representing an amount of steering in a clockwise and counter-clockwise direction from said rotational angular center such that said amount is zero at said rotational angular center.

* * * * *

UNITED STATES PATENT AND TRADEMARK OFFICE
CERTIFICATE OF CORRECTION

PATENT NO. : 4,970,906
DATED : November 20, 1990
INVENTOR(S) : Shibata et al.

It is certified that error appears in the above-identified patent and that said Letters Patent is hereby corrected as shown below:

col. 04, line 19    delete "Q"    insert --$\overline{Q}$-- col. 11, line 60    delete "and"    insert --said-- col. 12, line 26    delete "cooperating"    insert --cooperation--

Signed and Sealed this

Twenty-second Day of February, 1994

Attest:

BRUCE LEHMAN

*Attesting Officer*    *Commissioner of Patents and Trademarks*